May 10, 1932.                D. L. WOOD                 1,857,524
                             FILM PACK
          Filed Nov. 29, 1930              2 Sheets-Sheet 1

Inventor,
Donald L. Wood,

By  Newton M. Perrins
    George A. Gillette, Jr.
              Attorneys

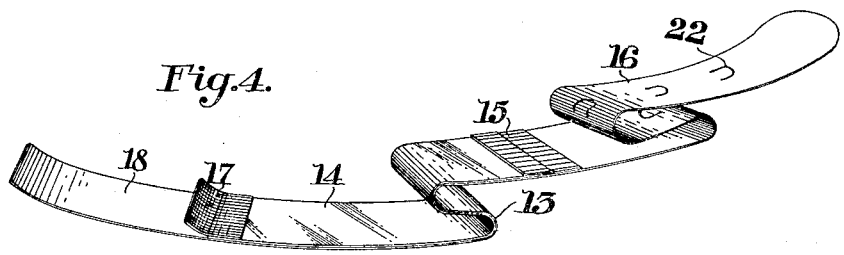
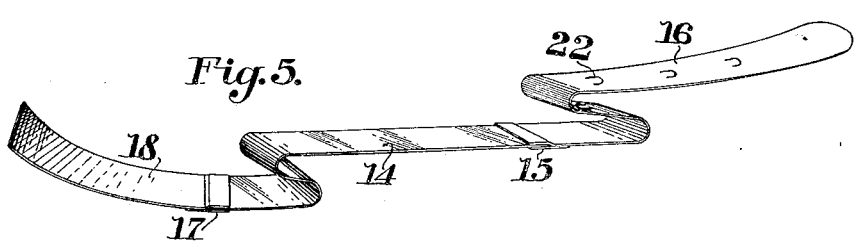
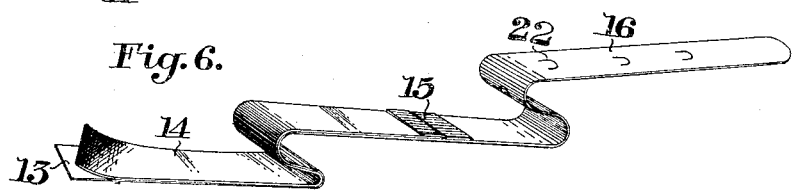
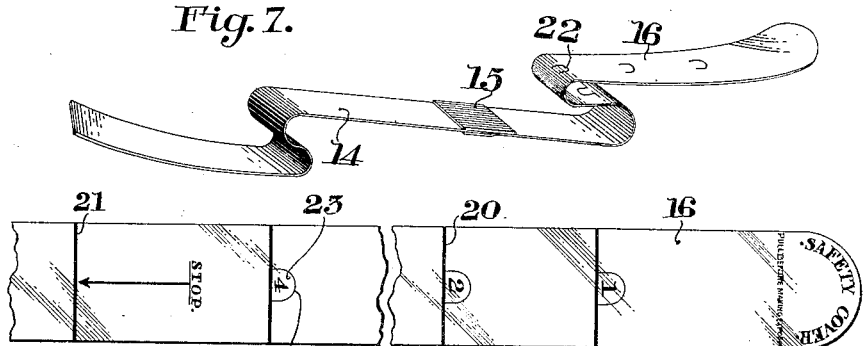

Patented May 10, 1932

1,857,524

UNITED STATES PATENT OFFICE

DONALD L. WOOD, OF ROCHESTER, NEW YORK, ASSIGNOR TO EASTMAN KODAK COMPANY, OF ROCHESTER, NEW YORK, A CORPORATION OF NEW YORK

FILM PACK

Application filed November 29, 1930. Serial No. 498,935.

This invention relates to photographic film packs, and more particularly to a film pack having a single strip of opaque material to draw a continuous film strip having a plurality of exposure areas thereon through the film pack casing.

The primary object of the invention is to provide a film pack of simple and inexpensive construction.

Another object of the invention is to provide a film pack with a single strip of opaque material adapted to draw a continuous film strip having a plurality of exposure areas across an exposure aperture.

A further object of the invention is the provision of a septum for the film pack which can be readily manufactured and which simultaneously functions to contain a continuous strip of film and to properly hold a portion of the film before the exposure aperture.

Other objects of the invention will suggest themselves to those versed in the photographic art as the description of the film pack is developed hereinafter.

The above objects are obtained by the production of a film pack which contains a continuous film strip for a plurality of exposures drawn about an elongated S-shaped septum in a sepentine path by a single strip of opaque material, the film strip being placed in a roll within a film magazine which is integral with said septum.

Like reference numerals designate similar elements of a film pack in the accompanying drawings wherein:

Fig. 4 is a perspective view of the preferred form of loading strip material comprising opaque strip material with a film strip mounted thereon.

Fig. 5 is a perspective view of a modified form of loading strip material having a leader and closure strip attached to the respective ends of the film strip.

Fig. 6 is a perspective view of another modified form of film strip and opaque strip material.

Fig. 7 is a perspective view of still another modified form of loading strip material having a leader attached to a bare film strip, and Fig. 8 is a plan view of the back of leader 16 showing the graduations and legends on the same.

Figure 1:
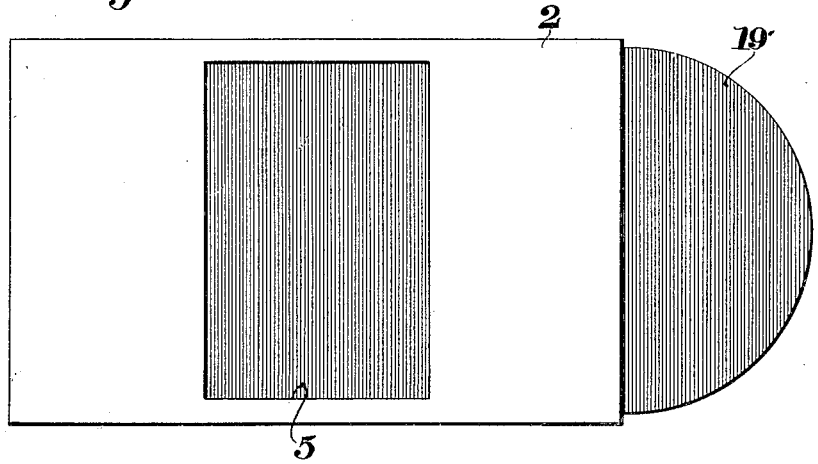
Fig. 1 is a plan view of the assembled film pack showing the exposure aperture.
Figure 2:
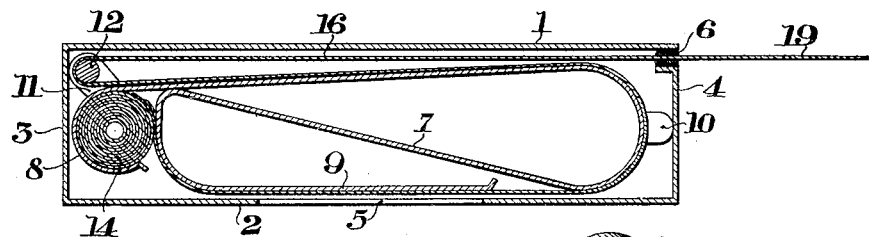
Fig. 2 is a vertical cross-section of the film pack taken longitudinally thereof.
Figure 3:
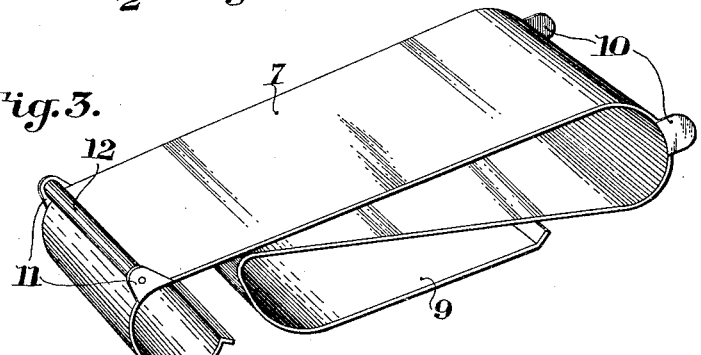
Fig. 3 is a detail perspective view of the septum.

The improved film pack comprises a casing made up of a top 1, a bottom or camera side 2, an end 3 and an end 4. The bottom or camera side 2 is provided with the exposure aperture 5. The end 4, of the casing has a slot through which the opaque strip may be wound and is provided with a light lock 6, of any known or suitable construction. positioned therein.

The septum 7 has the form of an elongated S and has a film magazine 8 made integral with one end thereof while a presser plate 9 is made integral with the other end of the septum 7. The film magazine 8 is preferably cylindrical in form to receive the light sensitive and/or opaque strip material preferably in the form of a roll. A pair of lugs 10 is made integral with the edge of the septum 7 at one end thereof and a pair of lugs 11 is made integral with the septum 7 adjacent the film magazine 8. A roller 12 is mounted between the pair of lugs 11 so that it may rotate freely. The pairs of lugs 10 and 11 also act to guide the film and opaque strip material around the septum 7 and to space the septum in proper position within the casing.

The preferred form of loading strip material for the film pack, see Fig. 4, comprises opaque strip material 13 upon which is mounted a film strip 14. One end of film strip 14 is fastened to opaque strip material 13 by means of a paster 15 at some distance from the semi-circular end thereof to provide a leader 16. The other end of the film strip 14 may be fastened to opaque strip material 13 by a paster 17 for developing but paster 17 is not normally attached to the film. The said opaque strip material is of such a length that it extends beyond the film strip to provide a closure strip 18 which is longer than the longitudinal dimension of exposure aperture 5. Another form of loading strip material for the film pack, see Fig. 5, comprises a film strip 14 with a leader 16 and a closure strip 18 attached to each end by means of pasters 15 and 17, respectively, thus leaving the majority of film strip 14 bare.

Another form of loading strip material for the film pack, see Fig. 6, comprises opaque strip material 13 with film strip 14 mounted thereon by a single paster 15, and one end of opaque material 13 is even with one end of film strip 14, the closure strip and other paster being omitted.

Still another form of loading strip material for the film pack, see Fig. 7, comprises merely a leader 16 of opaque strip material attached to a bare film strip 14 by means of a paster 15.

The leader 16 in all forms of the loading strip material is substantially equal in length to the path from the film magazine 8, past the exposure aperture 5, around the end of septum 7, to and around roller 12 and through the light lock 6, the semi-circular leader end 19 facilitates grasping the leader 16 to pull the same out of the film pack. A series of graduations 20 are provided on leader 16 being consecutively numbered, spaced at intervals equal to the longitudinal dimension of exposure aperture 5, equal in total extent to the length of film strip 14 and equal in number to the plurality of exposure areas thereon. Another graduation 21 and the legend "Stop" are on said leader 16 at such a point that after all of film strip 14 has been exposed and drawn past the exposure aperture 5, said graduation 21 and legend will be outside of the light lock 6 and leader 16 may be torn off even therewith.

Cut outs 22 are provided in leader 16 at each graduation 20 so that when leader 16 is torn off across light lock 6, small tabs 23 still project through the light lock for further extraction of the leader. The provision of such cut outs and tabs in a single leader is well known and forms no part of the present invention.

The operation of the film pack of the invention is as follows:

After attachment of the film pack to the camera, the leader 16 is drawn through the light lock until the graduation designated 1 appears, whereupon the protruding portion of the leader 16 is torn along said graduation, leaving a tab 23. The camera is now ready for the first exposure, after which the leader 16 is again drawn through the light lock until the second graduation appears. Thus the exposed film is moved around the septum and an unexposed portion of the film strip 17 is brought into place before the exposure aperture 5. The film is drawn through the pack at intervals as described and after the last exposure of film, the leader is again drawn out of the pack until the legend "Stop" and graduation 21 appear outside of the light lock.

This final movement of leader 16 moves film strip 14 beyond exposure aperture 5 so that presser plate 9 covers the same. The protruding portion of leader 16 is torn off even with light lock 6 and the film pack is removed from the camera. If, however, the preferred form of loading strip material is contained in the film pack, then this final movement of leader 16 moves closure strip 18 over exposure aperture 5 and presser plate 9 holds said closure strip 18 tightly over the exposure aperture to insure against the film strip 14 becoming fogged or light struck.

Since many modifications of my invention are possible, the above description is to be construed in an illustrative and not in a limiting sense.

Having now particularly described my invention, what I claim and desire to secure by Letters Patent of the United States is:

1. A photographic film pack comprising a casing provided with an exposure aperture, a septum within said casing, a film magazine integral with said septum, a continuous film strip for a plurality of exposures in said film magazine, and opaque strip material extending from said film strip around said septum in a serpentine path through said casing.

2. A photographic film pack comprising a casing provided with an exposure aperture, a septum within said casing, a circular film magazine integral with said septum, a continuous roll of film strip for a plurality of exposures in said film magazine, and opaque strip material extending from said film strip around said septum in a serpentine path through said casing.

3. A photographic film pack comprising a casing provided with an exposure aperture, a septum within said casing, a film magazine integral with said septum, a roller rotatably mounted on said septum, a continuous film strip having a plurality of exposures in said film magazine, and opaque strip material extending from said film around said septum and said roller in a serpentine path through said casing.

4. A photographic film pack comprising a casing provided with an exposure aperture, a light lock in one end of said casing, a septum within said casing, a film magazine integral with said septum adjacent the end of said casing opposite said light lock, a roller rotatably mounted on said septum adjacent said film magazine, a continuous film strip having a plurality of exposures in said film magazine, and opaque strip material extending around said septum, around said roller to said light lock.

5. A photographic film pack comprising a casing provided with an exposure aperture, an elongated S-shaped septum having one end resiliently covering said exposure aperture, a film magazine integral with the other end of said septum, a continuous film strip for a plurality of exposures in said film magazine, and a leader extending from said film, between said first mentioned free end of said septum and the exposure aperture, around said septum in a serpentine path through said casing.

6. A photographic film pack comprising a casing provided with an exposure aperture, a septum within said casing, a film magazine integral with said septum, a continuous film strip for a plurality of exposures in said film magazine, a leader extending from said film strip around said septum in a serpentine path through said casing, and a plurality of graduations on said leader spaced at intervals equal to the longitudinal dimension of the exposure aperture.

7. A photographic film pack comprising a casing provided with an exposure aperture, a septum within said casing, a film magazine integral with said septum, a continuous film strip for a plurality of exposures in said film magazine, a strip of opaque material consisting of a leader extending from said film around said septum in a serpentine path through said casing, a backing for said film, and a closure strip extending beyond the end of the film adapted to close said exposure aperture after the exposure of said film.

8. A photographic film pack comprising a casing provided with an exposure aperture, a septum within said casing, a film magazine integral with said septum, a continuous film strip for a plurality of exposures in said film magazine, a leader extending from said film around said septum in a serpentine path through said casing, and a closure strip extending from the end of said film a distance greater than the longitudinal dimension of said exposure aperture.

9. A septum for a photographic film pack, said septum being of elongated S-shape, and having a cylindrical film magazine integral with one end thereof.

10. A septum for a photographic film pack, said septum being of elongated S-shape, a resilient presser plate, and a cylindrical film magazine integral with the respective ends thereof.

11. A septum for a photographic film pack, said septum being of elongated S-shape, a resilient presser plate, and a cylindrical film magazine integral with the respective ends thereof, and a plurality of pairs of lugs integral with the edges of said septum whereby strip material is guided longitudinally over said septum.

12. A septum for a photographic film pack having an elongated S-shape comprising a cylindrical film magazine and a resilient presser plate integral with the respective ends thereof, pairs of lugs adjacent the ends of said septum integral with the edges thereof, and a roller rotatably mounted between the pair of lugs adjacent said film magazine.

13. Loading material for a photographic film pack comprising a continuous bare film strip having a plurality of exposure areas, and a leader of opaque material attached to one end of said film strip and provided with a plurality of graduations corresponding to the exposure areas of the film strip.

14. Loading material for a photographic film pack comprising a continuous film strip for a plurality of exposures, a leader of opaque material attached to one end of said film strip, and a closure strip also of opaque material attached to the other end of said film strip, said leader being longer than said film strip and longer than said closure strip.

15. Loading material for a photographic film pack comprising a strip of opaque material, a continuous film strip for a plurality of exposures mounted thereon in spaced relation to one end thereof to provide a closure strip, and in spaced relation to the other end of said opaque material to provide a leader strip, and graduations on said leader strip dividing a portion thereof equal to the length of the film strip into equal spaces equal in number to the plurality of exposures.

16. Loading material for a film pack comprising a strip of film adapted to receive a plurality of exposures and a leader strip attached to the film and of greater length than the film and bearing indicia beyond the end of the film for indicating exposure areas of the film spaced therefrom.

Signed at Rochester, N. Y., this 21st day of November, 1930.

DONALD L. WOOD.